United States Patent
McAuliffe et al.

(10) Patent No.: US 8,910,653 B2
(45) Date of Patent: Dec. 16, 2014

(54) VALVE ASSEMBLY

(71) Applicants: Christopher McAuliffe, Windsor, CT (US); Bruce R. Schroder, Agawam, MA (US)

(72) Inventors: Christopher McAuliffe, Windsor, CT (US); Bruce R. Schroder, Agawam, MA (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 111 days.

(21) Appl. No.: 13/672,074

(22) Filed: Nov. 8, 2012

(65) Prior Publication Data

US 2014/0124059 A1 May 8, 2014

(51) Int. Cl.
  *F16K 1/12* (2006.01)
  *G05D 16/20* (2006.01)
  *F16K 31/12* (2006.01)
  *G05D 16/10* (2006.01)

(52) U.S. Cl.
  CPC ............ *F16K 31/12* (2013.01); *G05D 16/2093* (2013.01); *G05D 16/106* (2013.01); *F16K 1/126* (2013.01)
  USPC ........................................................ 137/220

(58) Field of Classification Search
  CPC ............ F16K 1/12; F16K 1/123; F16K 1/126
  USPC .................................. 137/219, 220
  See application file for complete search history.

(56) References Cited

U.S. PATENT DOCUMENTS

| | | | | |
|---|---|---|---|---|
| 1,636,662 A | * | 7/1927 | Larner | 137/222 |
| 3,556,128 A | * | 1/1971 | Scaglione | 137/219 |
| 3,586,033 A | * | 6/1971 | Hieber | 137/220 |
| 3,734,120 A | * | 5/1973 | Rowe et al. | 137/220 |
| 3,792,713 A | * | 2/1974 | Zadoo | 137/486 |
| 3,865,168 A | * | 2/1975 | Bourcier de Carbon de Previnquieres | 152/213 A |
| 4,477,051 A | | 10/1984 | Ben-Yehuda | |
| 4,747,426 A | * | 5/1988 | Weevers | 137/220 |
| 5,020,771 A | | 6/1991 | Nakatsukasa et al. | |
| 5,785,082 A | | 7/1998 | Geis et al. | |
| 6,752,168 B1 | * | 6/2004 | Ottestad et al. | 137/220 |
| 6,877,714 B2 | | 4/2005 | Hall | |
| 7,237,570 B2 | | 7/2007 | Gamard et al. | |
| 7,293,579 B2 | | 11/2007 | Aardema et al. | |
| 7,555,905 B2 | | 7/2009 | Borcea | |
| 8,210,800 B2 | | 7/2012 | Suciu et al. | |
| 8,216,329 B2 | | 7/2012 | McAuliffe et al. | |
| 8,251,092 B2 | | 8/2012 | Spohn et al. | |
| 2012/0180501 A1 | | 7/2012 | Army | |
| 2012/0199211 A1 | | 8/2012 | Schroder et al. | |

* cited by examiner

*Primary Examiner* — Eric Keasel
*Assistant Examiner* — Kevin Barss
(74) *Attorney, Agent, or Firm* — Cantor Colburn LLP

(57) ABSTRACT

A valve assembly is provided and includes a poppet disposed to regulate a pressure of a fluid flowing through a pathway defined between the poppet and a valve body, a drive element configured to modulate a pressure of a servo fluid to thereby control a position of the poppet relative to the valve body and an actuator body coupled to the poppet and configured to deliver a supply fluid to the drive element from a first cavity defined between the poppet and the actuator body and to deliver the servo fluid from the drive element to a second cavity defined between the actuator body and the poppet. The poppet defines a filter through which fluid flows from the pathway into the first cavity as the supply fluid.

20 Claims, 2 Drawing Sheets

VALVE ASSEMBLY

BACKGROUND OF THE INVENTION

The subject matter disclosed herein relates to valves and, more particularly, to an inline valve assembly for use with a valve body.

Bleed systems and other air conditioning systems often require that incoming air be pressurized to a given level. This incoming air is, however, often drawn from a source that has highly variable pressures. Thus, it is frequently necessary to provide for valve systems upstream of the bleed system users like air conditioning systems that can produce the proper level of air pressurization.

To this end, valve systems have been provided with pneumatic actuators that frequently use close clearance variable area electro-mechanical devices (i.e., torque motors) to modulate the position of the valve to produce an outflow of air with the proper level of pressurization. These devices require contaminant free air supplies for reliable service. Typically, such contaminant free supplies are drawn from a main air flow with a reverse facing tube located upstream of the valve. This solution leads to installation issues arising from valve designs and coordination with air frames that frequently result in less than ideal filtration and resulting contamination of the control device.

BRIEF DESCRIPTION OF THE INVENTION

According to one aspect of the invention, a valve assembly is provided and includes a poppet disposed to regulate a pressure of a fluid flowing through a pathway defined between the poppet and a valve body, a drive element configured to modulate a pressure of a servo fluid to thereby control a position of the poppet relative to the valve body and an actuator body coupled to the poppet and configured to deliver a supply fluid to the drive element from a first cavity defined between the poppet and the actuator body and to deliver the servo fluid from the drive element to a second cavity defined between the actuator body and the poppet. The poppet defines a filter through which fluid flows from the pathway into the first cavity as the supply fluid.

According to another aspect of the invention, a valve assembly for a valve body is provided and includes a poppet disposed to regulate a pressure of a fluid flowing in a first direction through a pathway defined between the valve body and the poppet, a drive element configured to modulate a pressure of a servo fluid to thereby control a position of the poppet relative to the valve body and an actuator body coupled to the poppet and configured to deliver a supply fluid to the drive element from a first cavity defined between the poppet and the actuator body and to deliver the servo fluid from the drive element to a second cavity defined between the actuator body and the poppet. The poppet defines throughholes by which fluid flows in a second direction, which is traverse to the first direction, from the pathway into the first cavity as the supply fluid.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

The description provided below provides for effective filtration of supply air for a control device integral to an inline valve and requires little or no installation, coordination or compromise with the air frame. Supply air is drawn through the inlet side of a poppet to a volume on the backside (the poppet is used in the inline valve case but it is possible that a butterfly valve with a disc could also be used). Holes are located along the poppet in an area with laminar flow lines parallel to the poppet face. The holes are perpendicular to the airstream and act as a momentum particle separator or a filter. Filtered air can then be supplied to a torque motor, which controls a position of the poppet.

A pressure drop created by operation of the valve results in no hysteretic loads reacting on the bearings/bushings used to position the metering device (i.e., the poppet in an inline valve and the disc in a butterfly valve). Therefore the associated wear on the bushings/bearings is essentially eliminated. Also, with the elimination of the shaft/bushing hysteretic loads, dynamic control of the valve is significantly improved.

Figure 1:
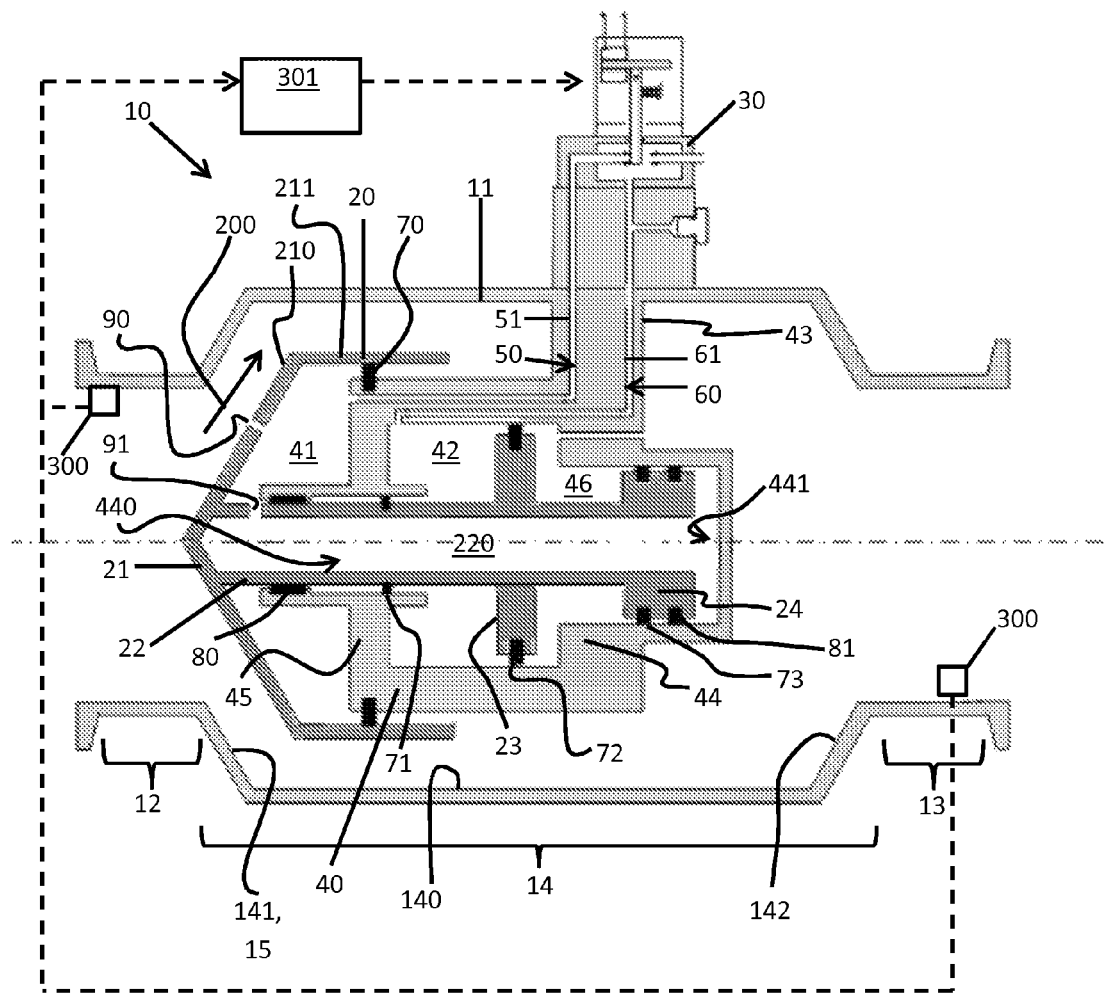
FIG. 1 is a schematic side view of a valve assembly in an open position in accordance with embodiments.
Figure 2:
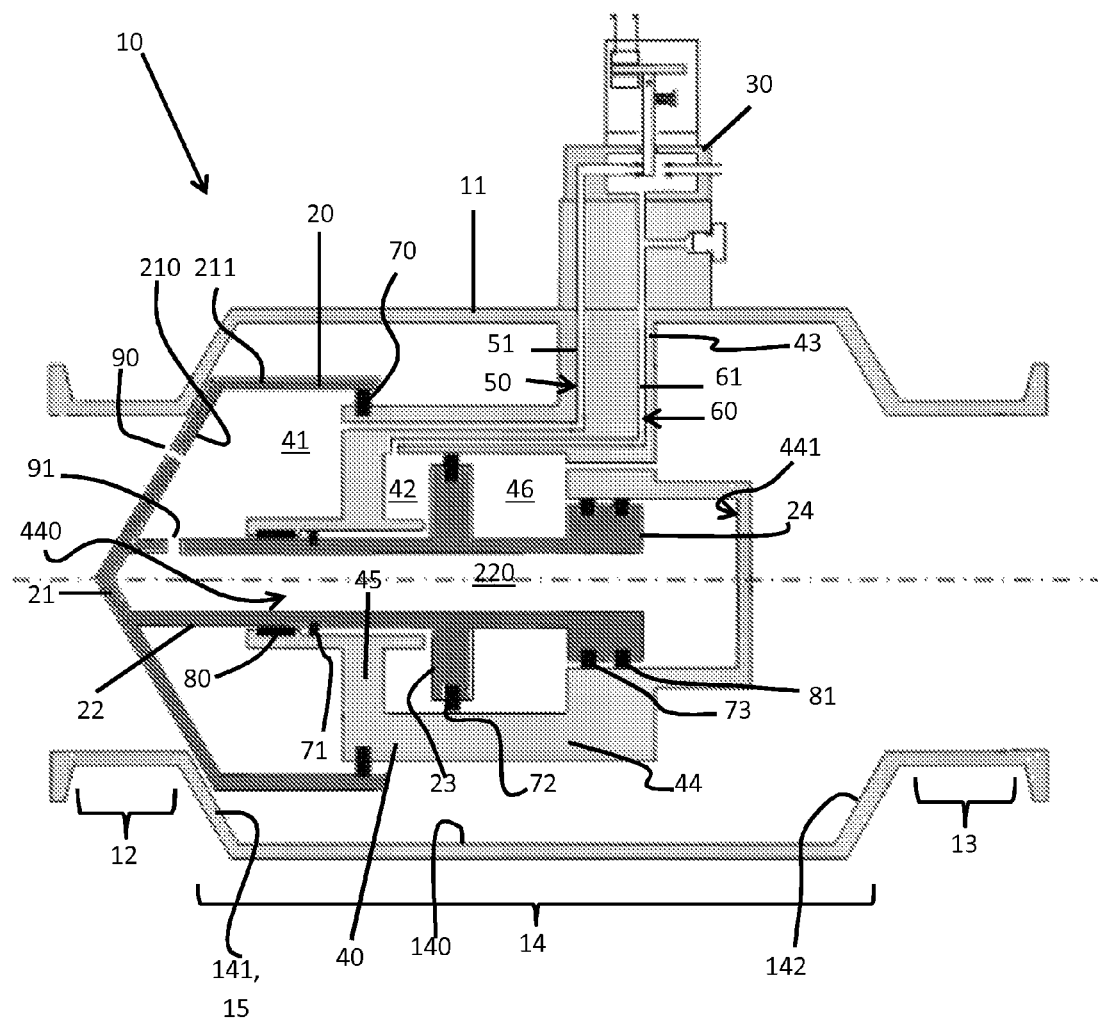
FIG. 2 is a schematic side view of a valve assembly in a closed position in accordance with embodiments.

With reference to FIGS. 1 and 2, a valve assembly 10 is provided for use with a tubular valve body 11. The valve body 11 includes an inlet 12, an outlet 13 and a central portion 14. The central portion 14 is fluidly interposed between the inlet 12 and the outlet 13. Fluid, such as air, may flow from the inlet 12, through the central portion 14 and to the outlet 13. As shown in FIGS. 1 and 2, the inlet 12 may have a first, substantially uniform diameter and the outlet 13 may have a second, substantially uniform diameter. The central portion 14 may have a tubular portion 140 and forward and aft tapered portions 141 and 142. The tubular portion 140 may have a substantially uniform diameter whereas the forward and aft tapered portions 141 and 142 may have increasing and decreasing diameters, respectively, with increasing axial distance from the inlet 12. The forward tapered portion 141 may thus form a valve seat portion 15.

Although described above as having substantially uniform diameters, it is to be understood that this is merely exemplary and that the inlet 12, the outlet 13 and the central portion 14 may have various shapes, sizes and relative orientations.

The valve assembly 10 includes a poppet 20, a drive element 30 and an actuator body 40. The poppet 20 is movably disposed within the valve body 11 to occupy at least one or more of an open position, multiple intermediate positions and a closed position with respect to the valve seat portion 15. When the poppet 20 occupies the open position, the poppet 20 is displaced from the valve seat portion 15 and defines a fluid pathway 200 along which fluid is permitted to flow (see FIG. 1) in parallel laminar lines along a surface of the poppet 20. This fluid turns downstream around an outer diameter of the poppet 20 and proceeds to flow through the central portion 14 to the outlet 13. When the poppet 20 occupies the closed position, the poppet 20 abuts the valve seat portion 15 and closes off the fluid pathway 200 to thereby prevent fluid flow along the fluid pathway 200 (see FIG. 2). This leads to a corresponding decrease in fluid pressures in the outlet 13.

When the poppet 20 occupies any of the intermediate positions, the poppet 20 is displaced from the valve seat portion 15 by a lesser degree than the open position and provides the fluid pathway 200 with a reduced flow area as required to meet downstream pressure requirements.

The drive element 30 may be disposed at an exterior of the valve body 11 and is configured to be receptive of a supply fluid 50, which is deliverable to the drive element 30 by way of a supply line 51 defined by the actuator body 40, and to modulate a pressure of a servo fluid 60, which is deliverable from the drive element 30 by way of a servo line 61 defined by the actuator body 40. In accordance with embodiments, when the pressure of the servo fluid 60 is modulated by the drive element 30 in increasing or decreasing modulation directions, the poppet 20 will tend to be biased toward or away from the valve seat portion 15. The drive element 30 is thus configured to control a position of the poppet 20 relative to the valve body 11 generally and the valve seat portion 15 in particular. Thus, the drive element 30 is configured to create and control a pressure drop across the valve assembly 10 as required to meet the downstream pressure requirements.

The drive element 30 may include a close clearance, variable area, electro-mechanical device (i.e., a torque motor). In such cases, an operation of the drive element 30 may be configured to be responsive to a predefined or selected condition. The predefined or selected condition may be, for example, fluid pressures in the inlet 12 or a combination of fluid pressures in the inlet 12, fluid pressures in the outlet 13 and fluid pressures in a third cavity 43 to be described below as well as an interior 220 of a tubular portion of the poppet 20 to be described below. By controlling the position of the poppet 20 based at least partly on such fluid pressures in the inlet 12, the outlet 13, the third cavity 43 and the interior 220, the drive element 30 may be able to regulate a pressure in the outlet 13 to be at or close to a predefined or selected target pressure even if the fluid pressures in the inlet 12 are variable. As such, the valve assembly 10 may be useful in various applications such as, for example, bleed air systems that require a supply of air that has a given pressure even if the supply of air is originally provided with variable pressures.

In accordance with further embodiments and, with reference to FIG. 1, pressure sensors 300 may be disposed in the valve body 11 to provide fluid pressure readings to a controller 301. This controller 301 may then determine whether the fluid pressures in the outlet 13 need to be increased, decreased or unchanged to meet the target fluid pressure. In accordance with this determination, the controller 301 will then issue control signals to the drive element 30 such that the drive element 30 will be caused to move the poppet 30 forward or aft from its current position.

The actuator body 40 is movably and sealably coupled to the poppet 20 and to the drive element 30. The actuator body 40 is formed to define the supply line 51 and the servo line 61 for delivery of the supply fluid 50 and the servo fluid 60, respectively. The actuator body 40 is configured to deliver the supply fluid 50 to the drive element 30 from a first cavity 41 defined between the poppet 20 and the actuator body 40 and to deliver the servo fluid 60 from the drive element 30 to a second cavity 42 defined between the actuator body 40 and the poppet 20. The first and second cavities 41 and 42 will both be described below.

In accordance with embodiments and, as shown in FIGS. 1 and 2, the poppet 20 may include a conical portion 21, a tubular portion 22, a first flange 23 and a second flange 24. The conical portion 21 includes a tapered surface 210 that is substantially parallel with the valve seat portion 15 and the laminar flow lines of the fluid flowing through the fluid pathway 200. The conical portion 21 may further include a tubular section 211 extending in the aft direction from an outer edge of the tapered surface 210. The tubular portion 22 is coupled to the concave side of the conical portion 21 and extends in the aft direction. The first and second flanges 23 and 24 each extend radially outwardly from the tubular portion 22. The second flange 24 is disposed downstream or aft of the first flange 23.

In accordance with additional embodiments and, as shown in FIGS. 1 and 2, the actuator body 40 includes a first arm 43, which is proximal with respect to the drive element 30, a cylinder 44 and a third flange 45. The cylinder 44 has an open forward end 440 and a closed aft end 441 and is coupled to a distal end of the first arm 43. The third flange 45 extends radially inwardly from an inner diameter of the cylinder 44 at the open forward end 440. The supply line 51 is defined to extend from the drive element 30, through the first arm 43 and through the cylinder 44 such that the supply line 51 originates at a forward face of the third flange 45. The servo line 61 is defined to extend from the drive element 30, through the first arm 43 and through the cylinder 44 such that the supply line 61 terminates aft of the third flange 45.

A first seal 70 is disposed between an inner diameter of the tubular section 211 and an outer diameter of the cylinder 44. A second seal 71 is disposed between an outer diameter of the tubular portion 22 and an inner diameter of the third flange 45. A third seal 72 is disposed between an outer diameter of the first flange 23 and an inner diameter of the cylinder 44. A fourth seal 73 is disposed between an outer diameter of the second flange 24 and an inner diameter of the cylinder 44. Bushings 80 and 81 are disposed to guide the movement of the poppet 20 within the inner diameter of the third flange 45 and the cylinder 44.

The first cavity 41 is substantially defined between the conical portion 21, the tubular portion 22 and the third flange 45. The second cavity 42 is substantially defined between the cylinder 44, the third flange 45, the first flange 23 and the tubular portion 22. In addition, a third cavity 46 is substantially defined between the tubular portion 22, the first flange 23, the second flange 24 and the cylinder 44. The third cavity 46 is fluidly communicative with the outlet 13 and thereby provides damping action to the driven movement of the poppet 20.

In accordance with further embodiments and, as shown in FIGS. 1 and 2, the tapered surface 210 is formed to define first through-holes 90 and the tubular portion 22 is formed to define second through-holes 91. The first through-holes 90 lead to the first cavity 41 and are oriented transversely with respect to the laminar flow lines of the fluid pathway 200. As such, a portion of the fluid flowing along the fluid pathway 200 in a first flow direction may be diverted to flow in a second flow direction, which is transversely oriented with respect to the first flow direction. The first through-holes 90 thus provide a fluid filtering effect particularly in cases where the fluid is air. The fluid flowing into the first cavity 41 via the first through-holes 90 and having been filtered in accordance with the orientation of the first through-holes 90 may then be supplied in a substantially contaminant free condition to the drive element 30 as the supply fluid 50 by way of the supply line 51.

An interior 220 of the tubular portion 22 is fluidly communicative with the first cavity 41 by way of the second through-holes 91. Thus, the interior 220 may be pressurized against the closed aft end 441 of the cylinder 44. This may provide an additional bias of the poppet 20 toward the valve seat portion 15.

In an operation of the valve assembly 10 as described above, the poppet 20 may be disposed in the open position if the fluid pressures in the inlet 12 are substantially near to the target pressure in the outlet 13. In such cases, the respective volumes of the first cavity 41 and the third cavity 43 are reduced and the volume of the second cavity 42 is increased. If the fluid pressures in the inlet 12 begin to increase, the pressurization of the interior 220 will begin to bias the poppet 20 toward the valve seat portion 15. In addition, the drive element 30 may increase the pressure of the servo fluid 60 relative to the supply fluid 50 to thereby move the poppet 20 toward the valve seat portion 15. This will close off the fluid pathway 200 and reduced the fluid pressures in the outlet 13. With the poppet 20 moved toward the valve seat portion 15, the respective volumes of the first cavity 41 and the third cavity 43 are increased and the volume of the second cavity 42 is decreased.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A valve assembly, comprising:
   a poppet disposed to regulate a pressure of a fluid flowing through a pathway defined between the poppet and a valve body;
   a drive element configured to modulate a pressure of a servo fluid to thereby control a position of the poppet relative to the valve body; and
   an actuator body coupled to the poppet and configured to deliver a supply fluid to the drive element from a first cavity defined between the poppet and the actuator body and to deliver the servo fluid from the drive element to a second cavity defined between the actuator body and the poppet,
   the poppet including a conical portion to abut a valve seat and prevent fluid flow through the pathway with the poppet occupying a closed position, the conical portion defining a filter through which fluid flows from the pathway into the first cavity as the supply fluid with the poppet occupying open and intermediate positions at which the poppet is displaced from the valve seat but not with the poppet occupying the closed position.

2. The valve assembly according to claim 1, wherein the drive element is disposed at an exterior of the valve body.

3. The valve assembly according to claim 1, wherein the fluid comprises air and the filter is oriented transversely relative to the pathway.

4. The valve assembly according to claim 1, wherein the valve body includes an inlet, an outlet and a central portion disposed between the inlet and the outlet,
   the central portion including the valve seat, which has an increasing diameter with increasing distance from the inlet.

5. The valve assembly according to claim 4, wherein the drive element is configured to drive poppet movement such that the poppet occupies at least one of:
   the open position at which the poppet is displaced from the valve seat and thereby permits fluid flow through the pathway;
   the closed position at which the poppet abuts the valve seat and thereby prevents fluid flow through the pathway; and
   the intermediate position at which the poppet is displaced from the valve seat by a lesser degree than the open position.

6. The valve assembly according to claim 5, wherein the poppet comprises:
   the conical portion formed to define the filter;
   a tubular portion coupled to the conical portion;
   a first flange radially extending from the tubular portion; and
   a second flange radially extending from the tubular portion downstream from the first flange.

7. The valve assembly according to claim 6, wherein the body comprises a third flange,
   the first cavity being substantially defined between the conical portion, the tubular portion and the third flange, and
   the second cavity being substantially defined between the third flange, the first flange and the tubular portion.

8. The valve assembly according to claim 6, wherein a third cavity is axially defined between the first and second flanges and is fluidly communicative with the outlet.

9. The valve assembly according to claim 1, wherein an operation of the drive element is responsive to fluid pressures in the valve body.

10. The valve assembly according to claim 1, wherein the drive element comprises a torque motor.

11. A valve assembly for a valve body, the valve assembly comprising:
    a poppet disposed to regulate a pressure of a fluid flowing in a first direction through a pathway defined between the valve body and the poppet;
    a drive element configured to modulate a pressure of a servo fluid to thereby control a position of the poppet relative to the valve body; and
    an actuator body coupled to the poppet and configured to deliver a supply fluid to the drive element from a first cavity defined between the poppet and the actuator body and to deliver the servo fluid from the drive element to a second cavity defined between the actuator body and the poppet,
    the poppet including a conical portion having a tapered surface configured to abut a valve seat of the valve body with the poppet occupying a closed position and thereby preventing fluid flow through the pathway, the tapered surface defining filtering through-holes by which fluid flows in a second direction, which is traverse to the first direction, from the pathway into the first cavity as the supply fluid with the poppet occupying open and intermediate positions at which the poppet is displaced from the valve seat but not with the poppet occupying the closed position.

12. The valve assembly according to claim 11, wherein the drive element is disposed at an exterior of the valve body.

13. The valve assembly according to claim 11, wherein the fluid comprises air and the through-holes are oriented to filter the air flowing into the first cavity.

14. The valve assembly according to claim 11, wherein the valve body includes an inlet, an outlet and a central portion disposed between the inlet and the outlet, the central portion including the valve seat, which has an increasing diameter with increasing distance from the inlet.

15. The valve assembly according to claim 14, wherein the drive element is configured to drive poppet movement such that the poppet occupies at least one of:
   the open position at which the poppet is displaced from the valve seat and thereby permits fluid flow through the pathway;
   the closed position at which the poppet abuts the valve seat and thereby prevents fluid flow through the pathway; and
   the intermediate position at which the poppet is displaced from the valve seat by a lesser degree than the open position.

16. The valve assembly according to claim 14, wherein the poppet comprises:
   the conical portion formed to define the through-holes;
   a tubular portion coupled to the conical portion;
   a first flange radially extending from the tubular portion; and
   a second flange radially extending from the tubular portion downstream from the first flange.

17. The valve assembly according to claim 16, wherein the body comprises a third flange,
   the first cavity being substantially defined between the conical portion, the tubular portion and the third flange, and
   the second cavity being substantially defined between the third flange, the first flange and the tubular portion.

18. The valve assembly according to claim 16, wherein a third cavity is axially defined between the first and second flanges and is fluidly communicative with the outlet.

19. The valve assembly according to claim 11, wherein an operation of the drive element is responsive to fluid pressures in the valve body.

20. The valve assembly according to claim 11, wherein the drive element comprises a torque motor.

* * * * *